Aug. 28, 1923.

A. L. HARVEY

CONTROL SYSTEM

Filed Jan. 16, 1920

1,466,285

WITNESSES:
H. T. Shelhamer
W<sup>m</sup> C. M<sup>c</sup>Coy.

INVENTOR
Albert L. Harvey
BY
Wesley G. Carr
ATTORNEY

Patented Aug. 28, 1923.

1,466,285

UNITED STATES PATENT OFFICE.

ALBERT L. HARVEY, OF WILKINSBURG, PENNSYLVANIA, ASSIGNOR TO WESTING-HOUSE ELECTRIC & MANUFACTURING COMPANY, A CORPORATION OF PENNSYLVANIA.

CONTROL SYSTEM.

Application filed January 16, 1920. Serial No. 351,815.

*To all whom it may concern:*

Be it known that I, ALBERT L. HARVEY, a citizen of the United States, and a resident of Wilkinsburg, in the county of Allegheny and State of Pennsylvania, have invented a new and useful Improvement in Control Systems, of which the following is a specification.

My invention relates to control systems and particularly to such systems as are adapted to control the operation of electric motors in opposite directions and to establish dynamic-braking circuits therefor.

The object of my invention is to provide a system of control that shall be adapted to operate a motor in opposite directions and which shall embody a resistor that may successively function as a starting resistor and as a dynamic-braking resistor.

In control systems that have heretofore been employed, it has been customary to provide separate starting resistors and dynamic-braking resistors and sufficient switching mechanisms to control the respective motoring and braking circuits.

In a control system constructed in accordance with my invention, the directional switches function during motoring conditions to establish operating circuits for the motor, and they are also employed to establish dynamic-braking circuits for the motor when reverse direction of operation is desired or when it is desired to arrest the operation of the motor. A resistor, which is provided for the motor, functions successively as a starting resistor and as a dynamic-braking resistor in a system which is capable of operating a motor in forward and reverse directions.

Figure 1:
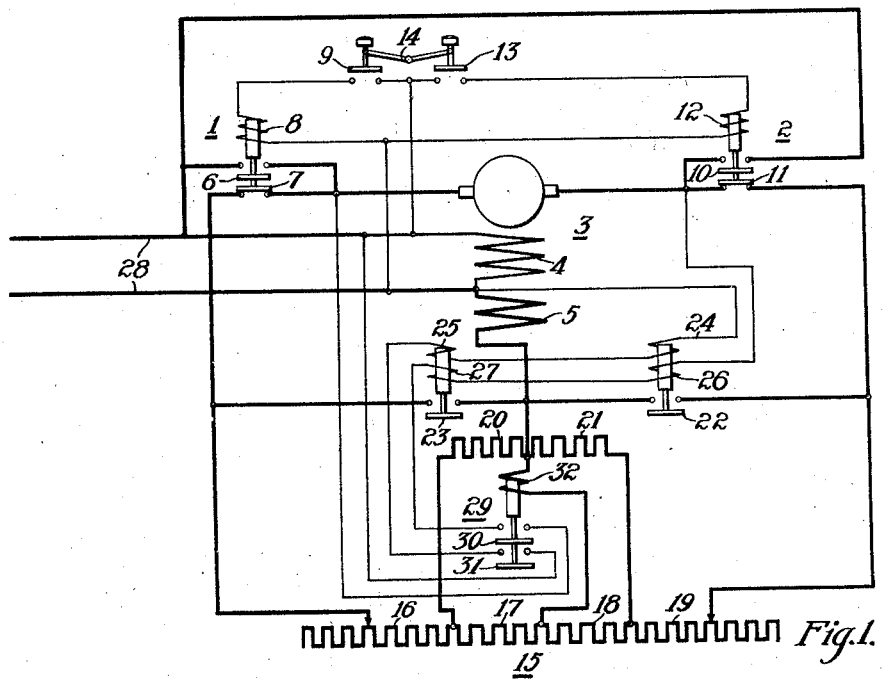
Figure 2:
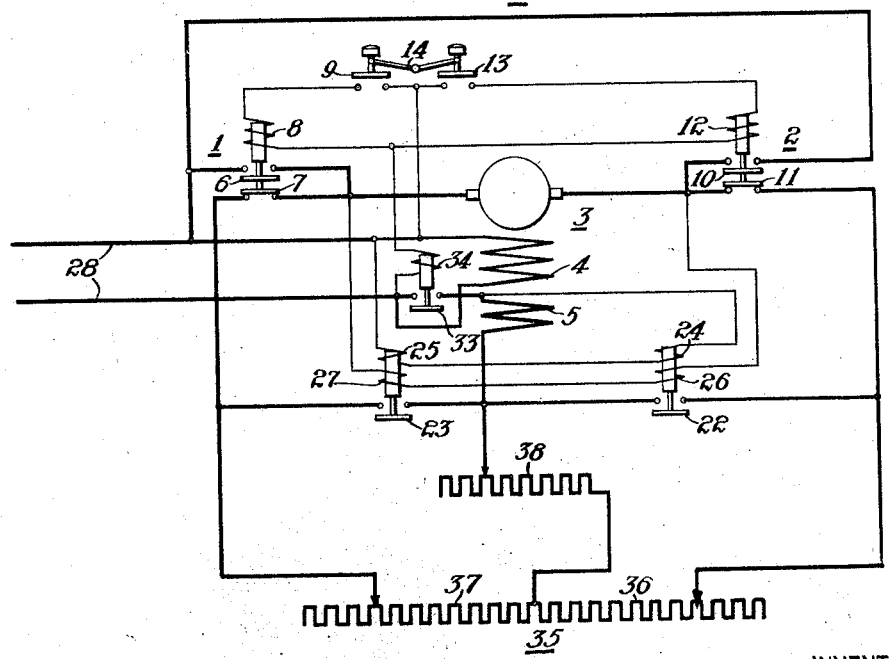

Figure 1 of the accompanying drawing is a diagrammatic view of a control system embodying my invention, and Fig. 2 is a diagrammatic view of a system of control embodying a modified form of my invention.

Referring particularly to Fig. 1 of the drawing, directional switches 1 and 2 are provided for controlling the direction of operation of a motor 3 which has a shunt field-magnet winding 4 and a series field magnet winding 5. Directional switch 1 has contactors 6 and 7 that are actuated by an electromagnet coil 8 which is energized when a push-button switch 9 is depressed. Directional switch 2 has contactors 10 and 11 and an actuating coil 12 which is energized by a circuit that is completed when push-button switch 13 is depressed. Push-button switches 9 and 13 are interlocked by means of a pivotally mounted bar 14 which prevents the simultaneous operation of the two push-buttons and functions in such manner that, when one push-button is depressed, the remaining push-button is raised.

A sectional resistor 15, having portions 16, 17, 18 and 19, and an auxiliary resistor having portions 20 and 21, are connected in circuit with the field-magnet winding 5 and are adapted to be shunted by electromagnetic switches 22 and 23. Switches 22 and 23 are respectively provided with actuating coils 26 and 27 which are connected in series and are energized in accordance with the armature electromotive force, and coils 24 and 25 that are also connected in series and are energized from a main supply circuit 28. Coils 24 and 26 are wound to assist each other and coils 25 and 27 are wound to oppose each other during forward operation of the motor. Reversing the direction of operation of the motor reverses the polarity of coils 26 and 27, and, accordingly, they oppose and assist the coils 24 and 25, respectively.

A relay 29, having contactors 30 and 31 and a series actuating coil 32, is connected to a point intermediate resistor portions 20 and 21 and a point intermediate portions 17 and 18 of resistor 15. Resistor portions 20 and 21 are of substantially equal resistance values and portions 17 and 18 are of substantially equal resistance values. Portions 16 and 19 of resistor 15 are adjustable.

Assuming that the apparatus of the system illustrated in Fig. 1 is positioned as shown in the drawing, forward direction of operation of the motor 3 may be established by depressing push-button 9 to energize electromagnet coil 8 from the supply circuit 28. The switch 1 closes to establish a circuit from the positive side of supply circuit 28, through contactor 6, the armature of motor 3, contactor 11 of switch 2, portions 17, 18 and 19 of resistor 15 and resistor portions 20 and 21 and field-magnet winding 5, to the negative side of the supply circuit 28.

The series coil 32 of relay 29 is of relatively low resistance and constitutes substantially a shunt connection for resistor portions 18 and 21. The starting current which traverses portion 19 of the resistor 15 divides, a portion of the current traversing resistor 18 and the actuating coil 32 of relay 29 and a second portion of the current traversing resistor portion 21. The relay 29 will, therefore, be actuated by the coil 32 to close contactors 30 and 31 and thereby establish energizing circuits for coils 24, 25, 26 and 27 of magnet contactors 22 and 23.

Switches 22 and 23 are so designed that the energization provided by coil 24 or coil 25, which is constant in polarity and degree, is not alone sufficient to close the corresponding switch. If, however, the energization of coils 24 and 25 is supplemented by energization of coils 26 and 27, to a degree corresponding to a predetermined motor speed, one of the switches will be actuated. The actuated switch being determined by the direction of operation of the motor.

In view of the fact that the resistance of the armature of motor 3 is relatively small, the electromotive force that is applied to coils 26 and 27, when the motor is initially connected to the supply circuit 28, is of a relatively small value. With the increase of speed of the motor armature, the electromotive force applied to coils 26 and 27 increases correspondingly and, since coils 24 and 26 energize the core member of the switch 22 in the same direction, under the heretofore assumed conditions, switch 22 closes when a predetermined armature speed is reached and switch 23 is maintained open, since coils 25 and 27 magnetize the core member in opposite directions.

The closure of magnet switch 22 shunts resistor section 21 and portions 18 and 19 of resistor 15 from the motor circuit and establishes a direct operating circuit for the motor which includes contactor 6, the motor armature, contactor 11, switch 22 and series field-magnet coil 5.

If, it is desired to arrest the operation of the motor, push-button 13 is depressed to such degree as to open the push-button switch 9 and thereby interrupt the energizing circuit of coil 8. The switch 1 opens to establish a dynamic-braking circuit for the motor 3 which extends from the motor armature, through contactor 11, resistor 15 and contactor 7, to the motor armature.

The shunt field-magnet winding 4 is energized during motoring and braking operations from the supply circuit 28. Resistor portions 20 and 21 are connected in shunt relation to portions 17 and 18 of resistor 15, and, since the resistor portions 20 and 21 are of substantially the same resistance value and portions 17 and 18 are likewise of the same resistance value, the coil 32 of relay 29 is connected to points of the same potential and, therefore, it remains unenergized. When the relay 29 interrupts the energizing circuits for coils 24, 25, 26 and 27, switches 22 and 23 will open.

If it is desired to reverse the direction of operation of motor 3, push-button 13 is depressed to complete an energizing circuit for coil 12. The switch 2 closes to establish a circuit from the positive side of the supply circuit 28, through contactor 10, the armature of motor 3, contactor 7, resistor portions 16, 17, 18, 20 and 21 and series field-magnet winding 5, to the negative side of the supply circuit.

The relay 29 is actuated, when the motor is operated in the opposite direction, in substantially the same manner as that described for the forward direction of operation of the motor. The coil 32 is of low resistance and is connected in shunt with resistors 20 and 17. Relay 29 is, therefore, closed when a circuit for the reverse direction of operation of the motor 3 is established.

For the reverse direction of operation of the motor, the direction of the armature voltage is reversed and, therefore, the coils 25 and 27 of the switch 23 assist each other. This action tends to close switch 23 whereas, coils 24 and 26 tend to magnetize the corresponding core member in opposing directions and therefore, the switch 22 remains open.

When the motor speed increases sufficiently to effect the actuation of switch 23 by increasing the voltage applied to coil 27, switch 23 closes and shunts the active portions 16 and 17 of resistor 15 and resistor 20 from the motor circuit.

Operation of the motor may be arrested by depressing push-button 9 to such degree as to open push-button switch 13 and thereby interrupt the energizing circuit of coil 12. Contactors 7 and 11, when the corresponding switches are open, establish a dynamic-braking circuit which includes resistor 15, to arrest the operation of the motor.

Fig. 2 illustrates a modified form of the invention shown in Fig. 1. A main line contactor 33 is controlled by means of a coil 34 which is connected in series relation to the coils 8 and 12 of contactors 1 and 2. A sectional resistor 35, having adjustable portions 36 and 37, constitutes a dynamic-braking resistor and a portion of the starting resistor. An auxiliary adjustable resistor 38 is provided in order that the resistances respectively inserted in the motor circuit during starting and during dynamic-braking operations may be independently adjustable. The remaining apparatus of Fig. 2 is similar to that illustrated in Fig. 1 and, since it performs the same functions, it is similarly designated.

Forward operation of the system shown in Fig. 2 of the drawing is established by depressing push-button 9 to complete a circuit comprising the coils 8 and 34 and thus effect the closing of contactors 6 and 33. The coil 34 of main-line contactor 33 is connected in series-circuit relation with coils 8 and 12 and is energized when either coil 8 or coil 12 is energized.

The closure of contactor 6 establishes a circuit from the positive side of the supply circuit 28, through the armature of motor 3, contactor 11, portion 36 of resistor 35, resistor 38, series field-magnet winding 5 and contactor 33, to the negative side of the supply circuit.

The operation of the motor is arrested by depressing push-button 13 to a degree sufficient to interrupt the circuit established by push-button 9 and thus open contactors 6 and 33. Contactor 33 interrupts the energizing circuits for coils 24 and 25 to open switch 22. Contactors 7 and 11 complete a braking circuit for the armature of motor 3 which includes resistor 35.

To operate the system in the reverse direction, push-button 13 is depressed to close contactors 33 and 10 by energizing coils 12 and 34.

Since the direction of the voltage that is applied to the armature of motor 3 is reversed when the direction of operation of the motor is reversed, the direction of the excitation of coils 26 and 27 is also reversed. Coils 25 and 27 energize the core member of switch 23 in like directions and tend to close that switch. When the armature of motor 3 attains a predetermined speed, switch 23 closes, in the manner hereinbefore described, to establish a circuit in shunt relation to the motor operating-circuit including the resistors 37 and 38.

The system herein described and illustrated in the accompanying drawing employs a resistor which functions as a starting resistor and also as a dynamic-braking resistor. The switches 22 and 23 are differentially wound in such manner that one of the switches is maintained open during motoring connections and, therefore, a suitable value of resistance is maintained in the braking circuit during all operating conditions. If, for any reason, the switch that shunts the active portion of the resistors fails to open, the motor is protected from an abnormal rush of current when braking connections are initially established by the portions of the resistor that remain unshunted during motoring operations.

Although I have illustrated certain simple and preferred forms of my invention I desire that only such limitations shall be imposed as are indicated by the spirit and scope of the appended claims.

I claim as my invention:

1. A control system comprising a motor, a resistor and a plurality of contactors for starting said motor in forward and reverse directions of operation and adapted to employ a portion of said resistor as a starting resistor and to establish a dynamic-braking circuit for said motor including said resistor.

2. A control system comprising a motor having an armature, a divided resistor, and a pair of directional contactors for reversing the direction of operation of said motor, said contactors being adapted to connect a portion of said resistor in series with said armature for starting said motor and to connect all of said resistor in a dynamic-braking circuit with said armature for arresting the operation of said motor.

3. A control system comprising a motor, a resistor adapted to function as a starting resistor and as a braking resistor and relay means associated with said resistor and adapted to be actuated when motoring conditions prevail and to be de-energized during dynamic-braking conditions, and means controlled by said relay for shunting certain portions of said resistor.

4. In a control system, the combination with a dynamo-electric machine and a resistor, of means responsive to the direction of operation of said machine for excluding different portions of said resistor from circuit.

5. In a control system, the combination with a dynamo-electric machine and a resistor, of plural means for excluding certain portions of said resistor from circuit, said means being respectively held open or closed in accordance with the direction of operation of said machine.

6. In a control system, the combination with a supply circuit and a dynamo-electric machine and a resistor of plural means for excluding certain portions of said resistor from circuit, each of said means having a plurality of actuating coils respectively energized from the armature of said machine and from said supply circuit.

7. In a control system, the combination with a supply circuit and a dynamo-electric machine and a resistor of plural means for excluding certain portions of said resistor from circuit, each of said means having a plurality of actuating coils respectively energized from said supply circuit similarly and from the armature of said machine oppositely.

8. In a control system, the combination with a dynamo-electric machine and a resistor, of plural means for excluding certain portions of said resistor from circuit, each of said means being subjected to a cumulative or a differential effect dependent upon the direction of rotation of said machine.

9. In a control system, the combination with a dynamo-electric machine and a resistor, of means for excluding said resistor from circuit, said means having a plurality of actuating coils having a cumulative effect or a differential effect dependent upon the direction of rotation of said machine.

10. In a control system, the combination with a supply circuit and a dynamo-electric machine and a resistor, of means for excluding said resistor from circuit, said means having a plurality of actuating coils respectively energized from said supply circuit always in the same direction and from the armature of said machine in opposite directions dependent upon the direction of rotation of said machine.

11. A control system comprising a dynamo-electric machine, a plurality of voltage-absorbing devices one of which is connected in partial shunt relation to the other, a relay connected between intermediate points of said devices, means for employing a portion of said devices during motoring conditions of said machine and all of them during dynamic-braking conditions, and means governed by said relay for shunting said devices under motoring conditions only.

12. A control system comprising a motor, a plurality of resistors, one being connected across a portion of the other, a relay connected between intermediate points of said resistors, means for connecting a portion of said resistors to one side of said intermediate points in circuit during motoring conditions and for connecting the entire resistors in circuit during dynamic-braking conditions, and means governed by said relay for shunting said resistors under motoring conditions only.

13. A control system comprising a motor, a plurality of resistors, one being connected across a portion of the other, a relay connected between the mid-points of said resistors, means for connecting one half of said resistors in circuit during motoring conditions and for connecting the entire resistors in circuit during dynamic braking conditions, and means governed by said relay for shunting said resistors, whereby no current traverses said relay during braking conditions.

14. A control system comprising a motor, a plurality of resistors, one being connected across a portion of the other, a relay connected between the mid-points of said resistors, means for connecting the one or the other half of said resistors in circuit dependent upon the direction of rotation of said motor during motoring conditions and for connecting the entire resistors in circuit during dynamic braking conditions to prevent current traversing said relay, and means governed by said relay for shunting the active half of said resistors under motoring conditions.

In testimony whereof, I have hereunto subscribed my name this 5th day of January, 1920.

ALBERT L. HARVEY.